United States Patent
Bent et al.

(10) Patent No.: US 10,728,017 B2
(45) Date of Patent: *Jul. 28, 2020

(54) PERFORMING VECTOR COMPARISON OPERATIONS IN FULLY HOMOMORPHIC ENCRYPTION

(71) Applicant: International Business Machines Corporation, Armonk, NY (US)

(72) Inventors: Graham A. Bent, Hursley (GB); Flavio A. Bergamaschi, Southampton (GB); Jack L. H. Crawford, Barking (GB); Hamish C. Hunt, Ashford (GB)

(73) Assignee: International Business Machines Corporation, Armonk, NY (US)

( * ) Notice: Subject to any disclaimer, the term of this patent is extended or adjusted under 35 U.S.C. 154(b) by 323 days.

This patent is subject to a terminal disclaimer.

(21) Appl. No.: 15/802,879

(22) Filed: Nov. 3, 2017

(65) Prior Publication Data

US 2019/0140818 A1 May 9, 2019

(51) Int. Cl.
*H04L 9/00* (2006.01)
*H04L 9/30* (2006.01)
(Continued)

(52) U.S. Cl.
CPC .............. *H04L 9/008* (2013.01); *G06F 17/16* (2013.01); *G06F 21/602* (2013.01);
(Continued)

(58) Field of Classification Search
CPC ....... G06F 21/602; G06F 17/16; H04L 9/008; H04L 63/0428; H04L 9/3093; H04L 2209/04
(Continued)

(56) References Cited

U.S. PATENT DOCUMENTS 8,565,435 B2  10/2013  Gentry et al.
8,630,409 B2  1/2014  Woodruff
(Continued)

FOREIGN PATENT DOCUMENTS

EP    2940921 A1   11/2015

OTHER PUBLICATIONS

Kim et al., "An Eigenvalue-based Pivot Selection Strategy for Improving Search Efficiency in Metric Spaces," 2016 International Conference on Big Data and Smart Computing (BigComp), Hong Kong, Jan. 2016, pp. 207-214, IEEE.
(Continued)

*Primary Examiner* — Kambiz Zand
*Assistant Examiner* — Benjamin A Kaplan
(74) *Attorney, Agent, or Firm* — Nathan M. Rau (57) ABSTRACT

In a fully homomorphic encryption scheme, a method is provided for performing a homomorphic operation on a data set by applying an encrypted operand supplied as a ciphertext. A data set containing 'i' library vectors, each with 'j' coefficients is subjected to a pivot operation such that each set of common 'j' coefficients is stored in respective library ciphertexts. A query ciphertext containing a query vector is then subjected to a homomorphic pivot operation to separate out its 'j' coefficients into respective pivoted query ciphertexts. A more efficient homomorphic computation can then be carried out between the ciphertexts of the pivoted forms of the query and library vectors so as to compute an encrypted set of vector differences between the query vector and each of the library vectors.

20 Claims, 8 Drawing Sheets

(51) Int. Cl.
*G06F 17/16* (2006.01)
*G06F 21/60* (2013.01)
*H04L 29/06* (2006.01)

(52) U.S. Cl.
CPC ........ *H04L 9/3093* (2013.01); *H04L 63/0428* (2013.01); *H04L 2209/04* (2013.01)

(58) Field of Classification Search
USPC ........................................................ 380/255
See application file for complete search history.

(56) References Cited

U.S. PATENT DOCUMENTS

| | | | |
|---|---|---|---|
| 9,100,185 | B2 | 8/2015 | Yasuda et al. |
| 9,313,028 | B2 | 4/2016 | Tamayo-Rios |
| 9,608,817 | B2 * | 3/2017 | Gentry ................... H04L 9/008 |
| 9,716,590 | B2 | 7/2017 | Gentry |
| 9,749,128 | B2 | 8/2017 | Calapodescu et al. |
| 2012/0039473 | A1 | 2/2012 | Gentry et al. |
| 2014/0140514 | A1 | 5/2014 | Gentry |
| 2015/0318991 | A1 | 11/2015 | Yasuda et al. |
| 2015/0358153 | A1 | 12/2015 | Gentry |
| 2016/0119119 | A1 | 4/2016 | Calapodescu et al. |
| 2016/0156595 | A1 | 6/2016 | Wu et al. |
| 2017/0063525 | A1 | 3/2017 | Bacon et al. |
| 2017/0149557 | A1 | 5/2017 | Bacon et al. |
| 2018/0359078 | A1 * | 12/2018 | Jain ....................... G06F 21/602 |
| 2019/0121951 | A1 * | 4/2019 | Nassi ..................... G06N 20/00 |

OTHER PUBLICATIONS

International Search and Examination Report for Application No. GB1816416.0, dated Mar. 27, 2019, 8 pages.

Bent et al., "Performing Vector Comparison Operations in Fully Homomorphic Encryption," U.S. Appl. No. 16/514,043, filed Jul. 17, 2019.

List of IBM Patents or Patent Applications Treated as Related, Signed Jul. 17, 2019, 2 pages.

Chatterjee et al., "Searching and Sorting of Fully Homomorphic Encrypted Data on Cloud," IACR Cryptology ePrint Archive, 2015, pp. 1-14, International Association for Cryptologic Research (IACR).

Gentry, C., "A Fully Homomorphic Encryption Scheme," Dissertation in partial fulfillment of the requirements for the degree of Doctor of Philosophy, Sep. 2009, 209 pages.

Gentry, C., "Fully Homomorphic Encryption Using Ideal Lattices," STOC '09: Proceedings of the forty-first annual ACM Symposium on Theory of Computing, 2009, pp. 169-178.

Halevi et al., "Design and Implementation of a Homomorphic-Encryption Library," Helib, Software Library, Nov. 30, 2012, 42 pages. http://researcher.ibm.com/researcher/files/us-shaih/he-library.pdf.

Halevi et al., "Design and Implementation of a Homomorphic-Encryption Library," Helib, Software Library, Apr. 11, 2013, 46 pages. https://people.csail.mit.edu/shaih/pubs/he-library.pdf.

Halevi et al., "Algorithms in HElib," IACR Cryptology ePrint Archive: Report 2014/106, 2014, 20 pages. https://eprint.iacr.org/2014/106.pdf.

Halevi et al., "Bootstrapping for HElib," IACR Cryptology ePrint Archive: Report 2014/873, Jan. 30, 2015, 28 pages. https://eprint.iacr.org/2014/873.pdf.

McGaw, Q., "Homomorphic binary circuits—hbc," project developed as Master final year project at Imperial College London, pp. 1-8, printed Nov. 2, 2017. http://qdm12.github.io/hbc/.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

Ye et al., "Anonymous Biometric Access Control," EURASIP Journal on Information Security, vol. 2009, Article ID 365259, pp. 1-17, Hindawi Publishing Corporation, DOI: 10.1155/2009/865259.

Yasuda et al., "Practical Packing Method in Somewhat Homomorphic Encryption," in: Data Privacy Management and Autonomous Spontaneous Security, DPM 2013 and SETOP 2013, LNCS 8247, pp. 34-50, 2014, Springer-Verlag Berlin Heidelberg, DOI: 10.1007/978-3-642-54568-9_3.

Togan et al., "Comparison-Based Computations Over Fully Homomorphic Encrypted Data," in: 2014 10th International Conference on Communications (COMM), IEEE, 2014, pp. 1-6, DOI:

* cited by examiner

PERFORMING VECTOR COMPARISON OPERATIONS IN FULLY HOMOMORPHIC ENCRYPTION

STATEMENT REGARDING FEDERALLY SPONSORED RESEARCH OR DEVELOPMENT

This disclosure was made with United States Government support under contract number W911NF-06-3-0001 awarded by the United States Army. The United States government has certain rights to this disclosure.

This disclosure was made with United Kingdom Government support under contract number W911NF-06-3-0001 awarded by the Ministry of Defence.

FIELD OF THE DISCLOSURE

The present disclosure relates to fully homomorphic encryption (FHE) and in particular to methods and systems of performing FHE so that vector comparison operations can be performed efficiently.

BACKGROUND

FHE is a family of encryption schemes that enables computation directly on the encrypted data. This has the advantage of outsourcing computation to an "honest-but-curious" party without having to trust them with your data as the data and intermediate results stay encrypted during computation.

SUMMARY

In order to be efficient, computing on encrypted data requires specific schemes tailored to how the encrypted data is organized. To address this problem, we propose a computer automated method of vector comparison which is generally applicable to any FHE scheme that defines an array-like data structure according to the BGV scheme, as specified above.

According to one aspect of the disclosure there is provided a computer automated method of performing a homomorphic operation on a data set by applying an encrypted operand. The method begins by providing a data set containing a plurality 'i' of library vectors, each library vector comprising a plurality 'j' of coefficients. Next the method carries out a pivot operation on the data set of library vectors such that each set of common 'j' coefficients is stored in respective library ciphertexts. Then a query ciphertext is received containing in encrypted form at least one query vector, also each comprising said plurality of coefficients. Also a homomorphic pivot operation is carried out on the query ciphertext to separate each of its 'j' coefficients into respective pivoted query ciphertexts. The method carries out a homomorphic computation between the ciphertexts of the pivoted forms of the query and library vectors so as to compute an encrypted set of vector differences between the query vector and each of the library vectors. Finally the method transmits the encrypted set of vector differences as a result.

This method organizes the data containing the ciphertexts in a way that exploits coarse grain parallelism of the underlying computer hardware on which the computations will be performed by pivoting the data to maximize use of multi-core, multi-thread computer processors and also to better pack the data within the data structures being used, which is especially beneficial for larger data sets.

The homomorphic computation may comprise in certain embodiments, calculating in a homomorphic difference operation a difference parameter value representing a vector difference between the 'jth' coefficient of the query vector and the 'jth' coefficient of every library vector, repeating for each other value of 'j' so that 'j' vector difference parameter values are obtained, and homomorphically combining the difference parameter values to obtain said encrypted set of vector differences between the query vector and each of the library vectors.

The difference parameter value may be the square of the vector difference.

The method may also comprise further processing said encrypted set of vector differences by performing a homomorphic threshold calculation using a homomorphic polynomial evaluation.

The library vectors may represent a physical entity, and the coefficients of the library vectors may represent attributes of the physical entity. For example, the physical entity may be a person. In one particular group of implementations, the vectors are mapped to database records relating to people. The people may be natural or legal persons. Examples might be medical records, criminal records, banking records, company records or tax records. In the case of natural persons in particular, the attributes may be physical attributes, such as a biometric parameter. Example biometric parameters are facial form, fingerprint, iris pattern, voice and DNA. Physical attributes may also be associated with objects, such as documents (e.g. passports), banknotes or packaging (e.g. as an anti-counterfeiting measure), such as wood fiber patterns in paper or cardboard or embedded holograms.

The claimed approach is based on the idea of pivoting the data to form a structure for encoding the vectors which enables more efficient comparison operations to be performed within a homomorphic encryption scheme. Specifically, it is possible to realize one or more of the following advantages with certain embodiments:

the pivoted data structure allows high parallelism for ease of distribution to multiple processing cores and threads;

the pivoted data structure is easier to reason with, since programming of the method to distribute the computing tasks among multiple processing cores is straightforward based on the mapping of the ciphertexts that are obtained by the pivoting operations;

the pivoted data structure is more space efficient in that a ciphertext block can keep inserting vectors without creating dead space; and significant improvement in computational efficiency is seen for realistic data sets.

According to another aspect of the disclosure, there is provided a computer program stored on a computer readable medium and loadable into the internal memory of a server, comprising software code portions, when said program is run on a server, for performing the above-described method. A computer program product storing the computer program may also be provided.

It will be understood that the method and associated computer program and computer program product may form part of a service provided in a cloud computing environment, for example based on a client-server model, where the server is a node hosted in the cloud and the clients are other nodes in the cloud with access to the server via a network connection.

BRIEF DESCRIPTION OF THE DRAWINGS

In the following, the disclosure will further be described by way of example only with reference to exemplary embodiments illustrated in the figures.

DETAILED DESCRIPTION

In the following detailed description, for purposes of explanation and not limitation, specific details are set forth in order to provide a better understanding of the present disclosure. It will be apparent to one skilled in the art that the disclosure may be practiced in other embodiments that depart from these specific details.

The disclosure may be implemented in a system, a method, and/or a computer program product. The computer program product may include a computer readable storage medium (or media) having computer readable program instructions thereon for causing a processor to perform methods embodying the disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosure.

Aspects of the disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIG.s illustrate the architecture, functionality, and operation of possible implementations of systems, methods, and computer program products according to various embodiments of the disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIG.s. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
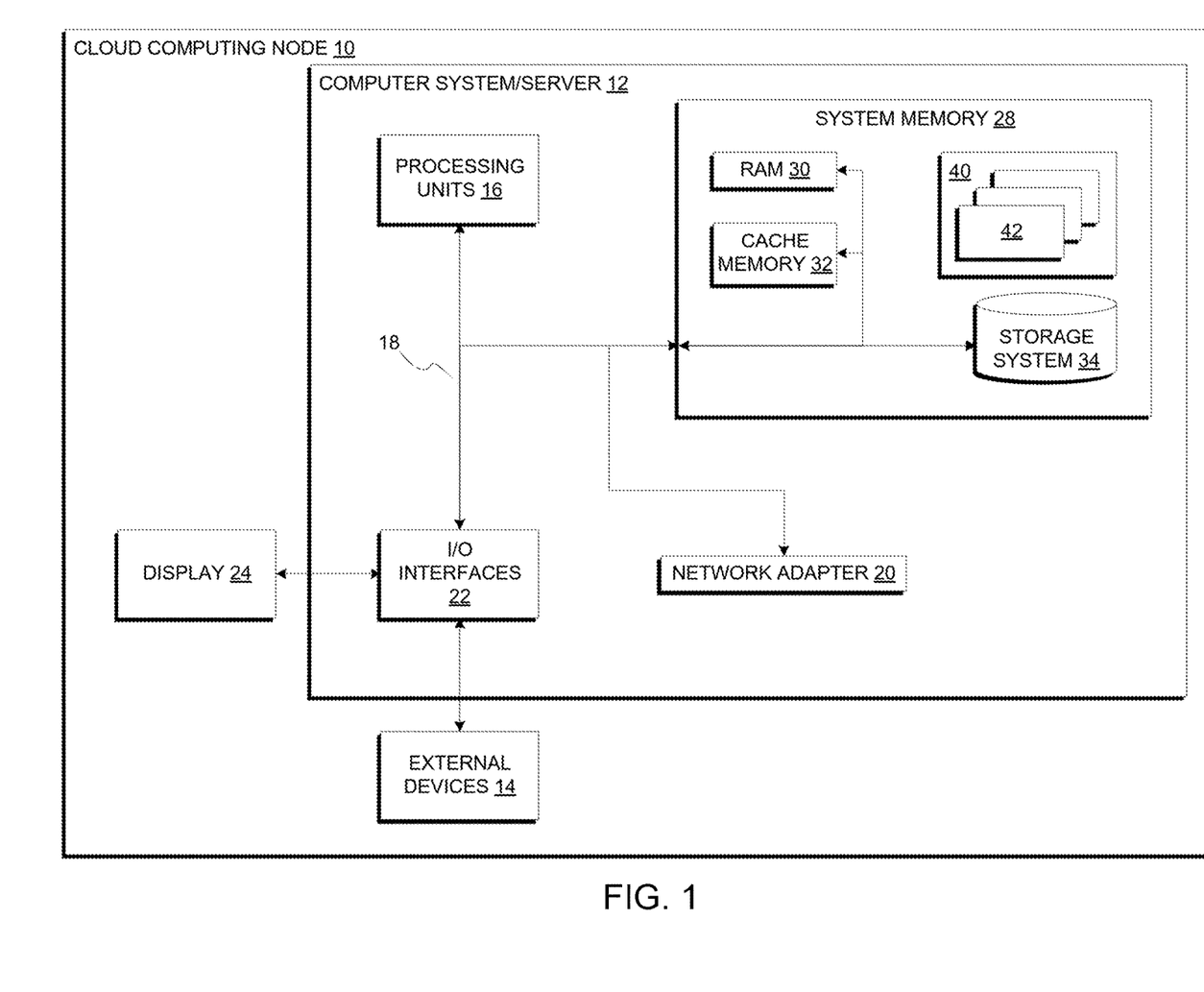
FIG. 1 shows a cloud computing node used in a first embodiment of a system according to the disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the disclosure.

Program/utility 40, having set of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Set of program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
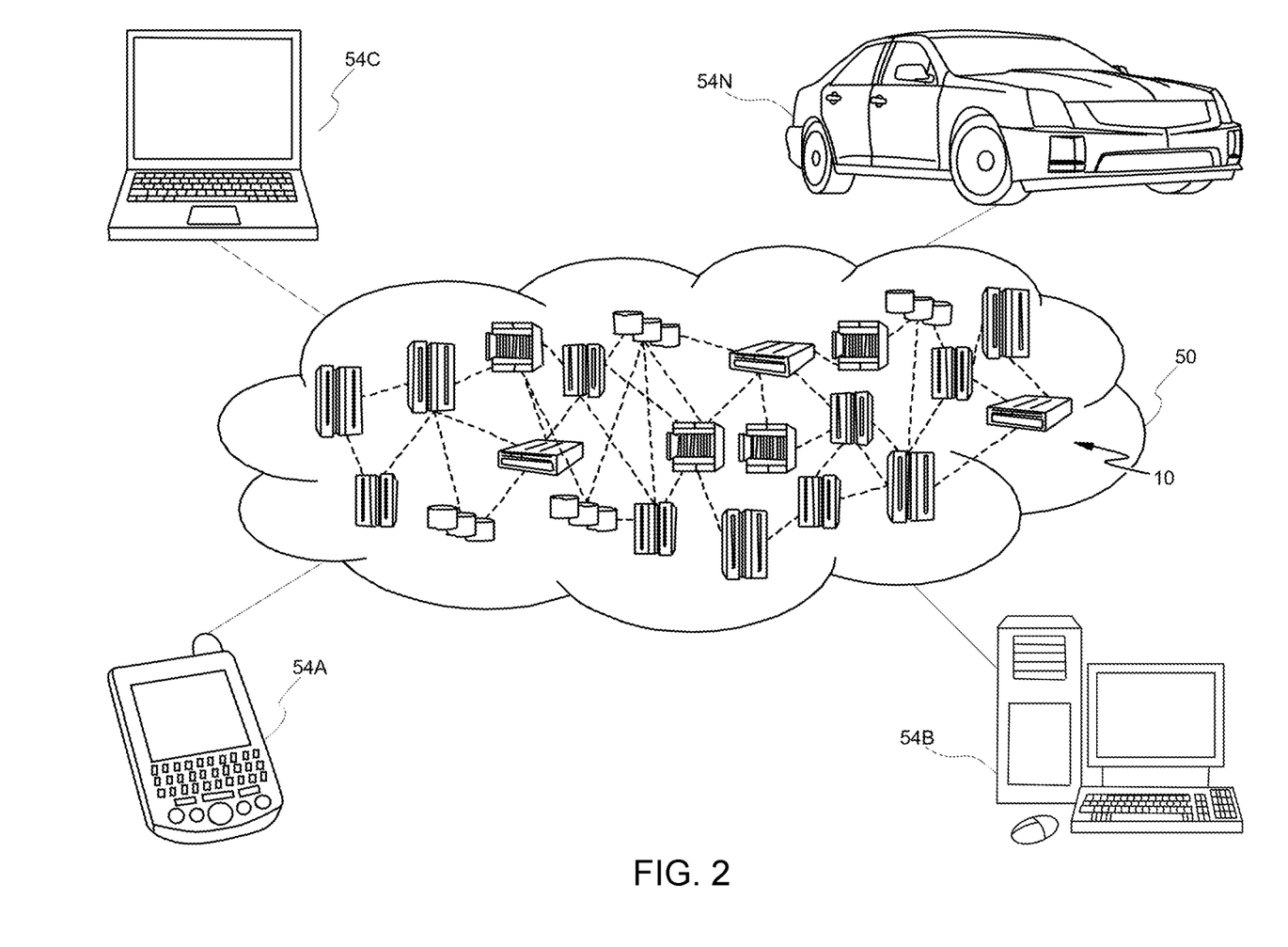
FIG. 2 shows an embodiment of a cloud computing environment (also called the "first embodiment system") according to the disclosure.

Referring now to FIG. 2, illustrative cloud computing environment 50 is depicted. As shown, cloud computing environment 50 comprises one or more cloud computing nodes (e.g., cloud computing node 10) with which local computing devices used by cloud consumers, such as, for example, personal digital assistant (PDA) or cellular telephone 54A, desktop computer 54B, laptop computer 54C, and/or automobile computer system 54N may communicate. Cloud computing nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing node 10 and cloud computing environment 50 can communicate with any type of computerized device over any type of network and/or network addressable connection (e.g., using a web browser).

Figure 3:
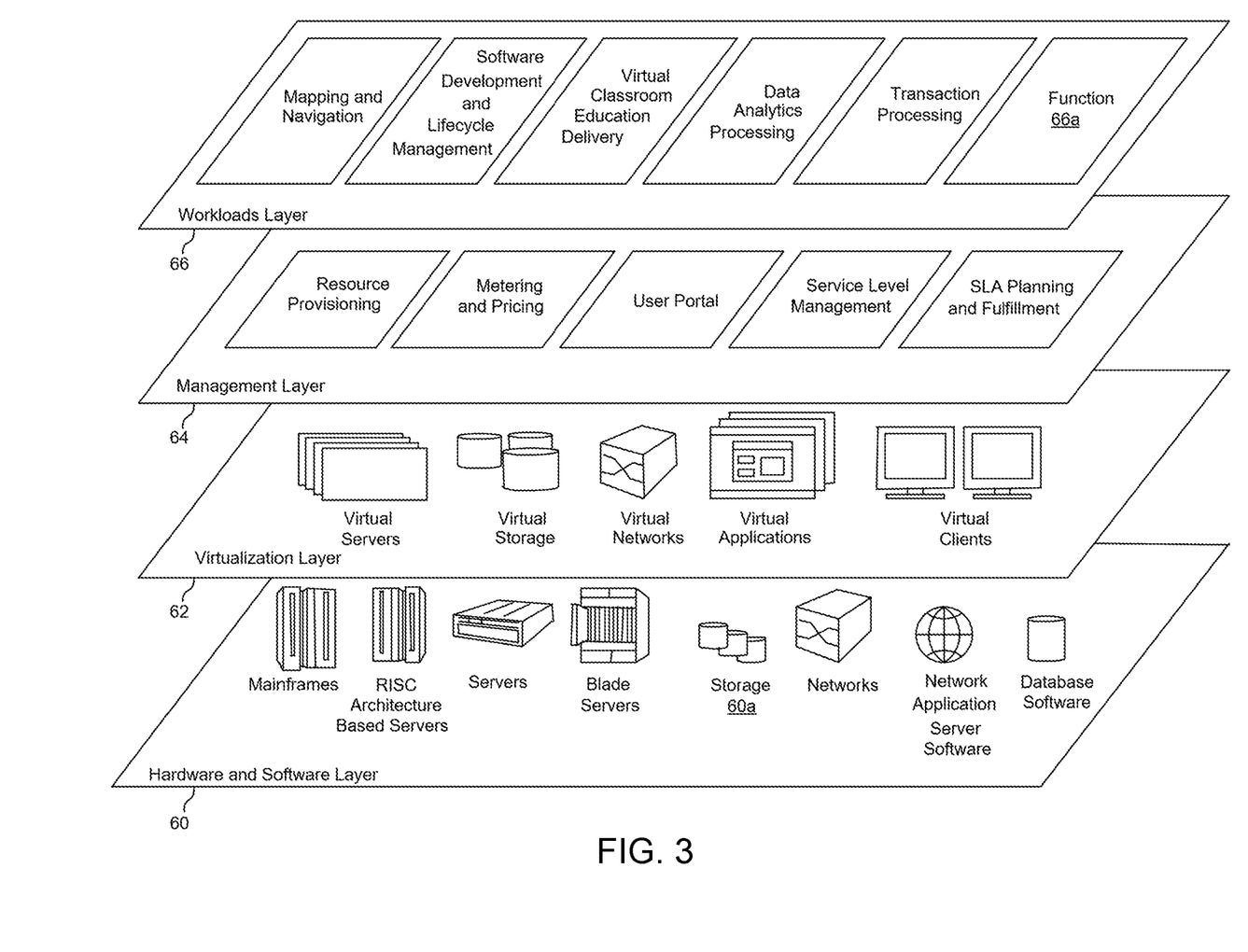
FIG. 3 shows abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the disclosure (see function block 66a) as will be discussed in detail, below, in the following sub-sections of this Detailed description section.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The descriptions of the various embodiments of the disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term vector is used here and throughout this document to mean a mathematical object used to represent the data comprising a plurality of elements which we refer to as coefficients, each coefficient having a value representing an attribute of the data.

International Business Machines Corporation (IBM) of Armonk, N.Y. has developed a FHE software library which is called HElib. HElib implements a variant of the Brakerski-Gentry-Vaikuntanathan (BGV) homomorphic encryption scheme with an adapted bootstrapping scheme and Smart-Vercauteren ciphertext packing techniques. HElib is written in C++ and uses the NTL C++ mathematical library The HElib software library and the design and implementation details of HElib and specifically the above-mentioned publications describing and documenting HElib are incorporated herein by reference in their entirety.

FHE computations are in general computationally expensive. Moreover, powerful computers suitable for FHE computations typically have processor architectures that are multi-core and multi-thread. The optimal use of multi-core, multi-thread computers for FHE computations therefore requires that the computational tasks are configured to permit them to be efficiently subdivided to be run concurrently in different cores and threads.

In HElib, for example, the main data type is the integer polynomial modulo a cyclotomic polynomial which gives an "array-like" data type, where the elements or slots of the "array" are given by the object's residues for packing data and performing single instruction, multiple data (SIMD) operations. For example, in an operation:

$$\text{ciphertext1} \times \text{ciphertext2} = \text{ciphertext3}$$

ciphertext3 contains the multiplied results of the slots in ciphertext1 and ciphertext2, multiplied elementwise.

The term ciphertext is used here and throughout this document with its normal meaning, i.e. the result of encryption of another text, a plaintext. The term ciphertext with respect to FHE has the additional meaning of the data type described above encrypted by the BGV method, wherein the values in the plaintext will undergo FHE computation whilst encrypted.

The term slot is used here and throughout this document to mean a dimension of an at least two-dimensional array-like data type given by the residues of an unencrypted ciphertext subject to FHE computations.

The organization of the data amongst the slots of the ciphertexts is key for performing efficient comparisons in FHE. Moreover, if a comparison is being performed to test for matching, then a threshold function will typically also need to be employed, e.g. return a value representing a match (i.e. a one) or a non-match (i.e. a zero), as in the case of matching feature vectors of images of human faces for facial recognition. The threshold function can be homomorphically implemented as a polynomial function that can be evaluated homomorphically supported in HElib. However, evaluating polynomial functions homomorphically is very computationally costly. It is therefore important to consider computational efficiency of both the comparison function and any thresholding function which may also be needed.

Background Example

In the following worked background example, and also in the subsequent example embodying the disclosure, the comparison is of Euclidean distance, but other vector comparison metrics can be used with the same approaches. What is important is that the metric used to compare one vector with another includes a slot-wise operation between ciphertexts. In the case of the Euclidean distance, the metric is the square root of the sum of the squared difference of two vectors, which in mathematical notation is as follows:

$$d_i = \text{sqrt}(\Sigma j=1 \text{ to } M\{(P_{ij}-S_{ij})^2\}).$$

where M is the number of coefficients per vector.

It is noted that, it is not necessary to perform the square root to compare distances. Therefore, the comparison computation is somewhat simplified given that a generic, efficient way of performing square roots is not yet known.

Figure 4:
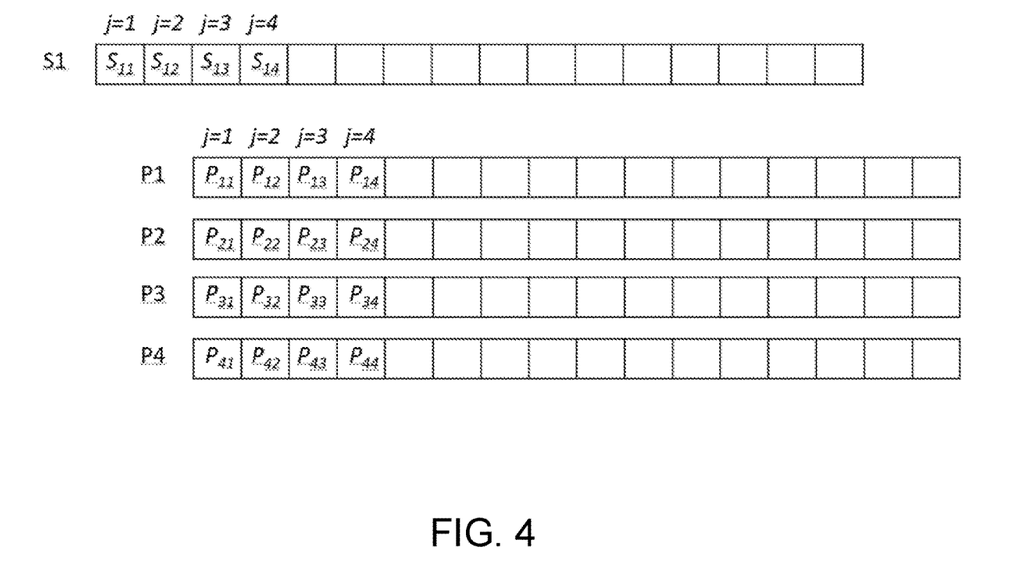
FIG. 4 shows a data set vector according to a background example.

FIG. 4 illustrates one possible, perhaps straightforward, approach of orienting the data in a manner optimized for comparison operations. In this approach, each vector is represented by a ciphertext where each slot is a coefficient of the vector. This approach is not part of the prior art.

Nevertheless, we include it as a background example to help better understand the nature of the problem being addressed and as a counterpoint to the approach of the disclosure.

A query vector S1 with coefficients Sj of S1, S2, S3 and S4 is to be compared with each of 'N' vectors Pi (i.e. P1, P2, P3, P4 . . . . Pi . . . . PN), which we call library vectors, where each library vector is encoded in its own ciphertext and the 'ith' library vector Pi has coefficients Pij, with 'j' being the coefficient order. In this example, 'j' is varied from 1 to 4, that is four is the total number of coefficients, 'M', that exist, but it will be understood that any number of coefficients 'M' could be used. With M=4, for i=2, the coefficients are then P21, P22, P23 and P24.

In concrete implementations, Pi could for example be a vector relating to the face of an 'ith' person in a group of 'N' people, where the task is face recognition of a particular person among 'N' possibles or suspects on the basis of the query vector S1, where the task is carried out on the basis of 'M' facial attributes, stored in the coefficients 'j'.

Making a ciphertext data set of multiple vectors, i.e. 'N' vectors in our example, is generally inefficient, since a ciphertext's capacity tends to be very large (ciphertext size being the main security factor in FHE) in comparison to the vector data to be stored, which is a wasteful.

The principal steps in a threshold comparison between ciphertext vectors Pi and S1 for i=1 to N according to the background example will be:

1. Set i=1
2. Calculate the difference in Euclidian distance between vectors Pi and S1, which we call 'delta'
3. Calculate delta^2
4. Sum the coefficients contained in each delta^2 to obtain delta^2 for Pi
5. Calculate threshold between Pi and S1 by polynomial evaluation
6. If i< >N then increment 'i' and jump back to 2 to compare the next vector Pi+1 with the query vector S1.
7. If i=N then finish.

Summation can be carried out using the HElib function for running and total sums as described in the above-referenced article "Algorithms in HElib" Shai Halevi and Victor Shoup, Cryptology ePrint Archive: Report 2014/106 https://eprint.iacr.org/2014/106.pdf.

It is noted that the threshold calculation is applied to every Pi, i.e. 'i' times, where i is the current vector, so the threshold calculation is computationally expensive.

The role of the threshold is to check for similarity in cases where matching will not be exact, but rather "fuzzy", such as in facial recognition where two images of the same person will be expected to generate slightly different feature vectors, so it is not sensible to test for equality, because the Euclidean distance between the two vectors (person and suspect) will not be exactly zero. In applications where matching is required to be exact, the threshold step is not needed. However, if a threshold function using polynomial evaluation is not required, a transform may still be required to turn metric values to match values such as the function $f(x)=1-FLT(x)$ where the FLT is Fermat's little theorem. The function $f(x)$ takes a ciphertext x and returns a ciphertext with values in slots of a one for a match and a zero for a non-match. These points are relevant not only for this background example, but also for embodiments of the disclosure.

Figure 5:
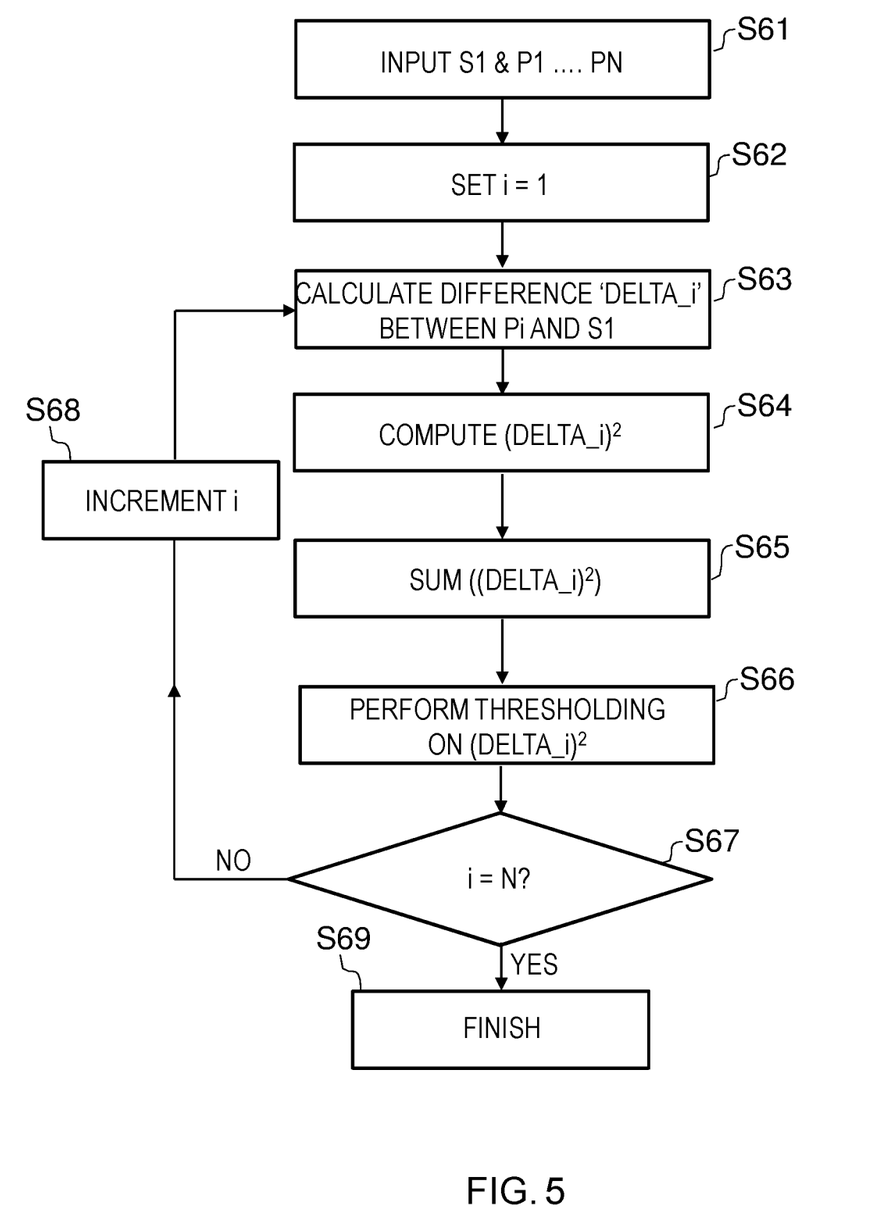
FIG. 5 is a flowchart showing a method according to the background example.

FIG. 5 is a flowchart showing the above-described method for performing a threshold comparison according to the background example.

In Step S61, a data set containing a plurality 'i' of library vectors Pi (i.e. P1 . . . . PN) is provided, each library vector Pi comprising a plurality 'j' of coefficients Pij, as well as a query vector S1 also having the same 'j' coefficients, where 'j' runs from 1 to M.

In Step S62, a counter for 'i' is initialized, i.e. Set i=1.

In Step S63, the method calculates the difference between vectors Pi and S1, results in a vector which we call 'delta_i' for each i.

In Step S64, the method calculates the square of delta_i, 'delta_i^2' (='delta_i'×'delta_i').

In Step S65, the method computes the sum of all 'j' coefficients of the square of delta_i for a given 'i'.

In Step S66, the method performs a threshold operation on the sum of the coefficients of the square of delta_i for a given i to compare Pi and S1 by polynomial evaluation resulting in a match vector ones for match or zeros for non-match for each i.

In Step S67 it is tested whether i has reached N. If i< >N then in Step S68 there is an increment of 'i' and process flow jumps back to Step S63 to compare the next vector Pi+1 with the query vector S1. If i=N then in Step S69 the process is complete and finishes resulting in a set of match vectors for each i.

Examples According to Embodiments of the Disclosure

Figure 6:
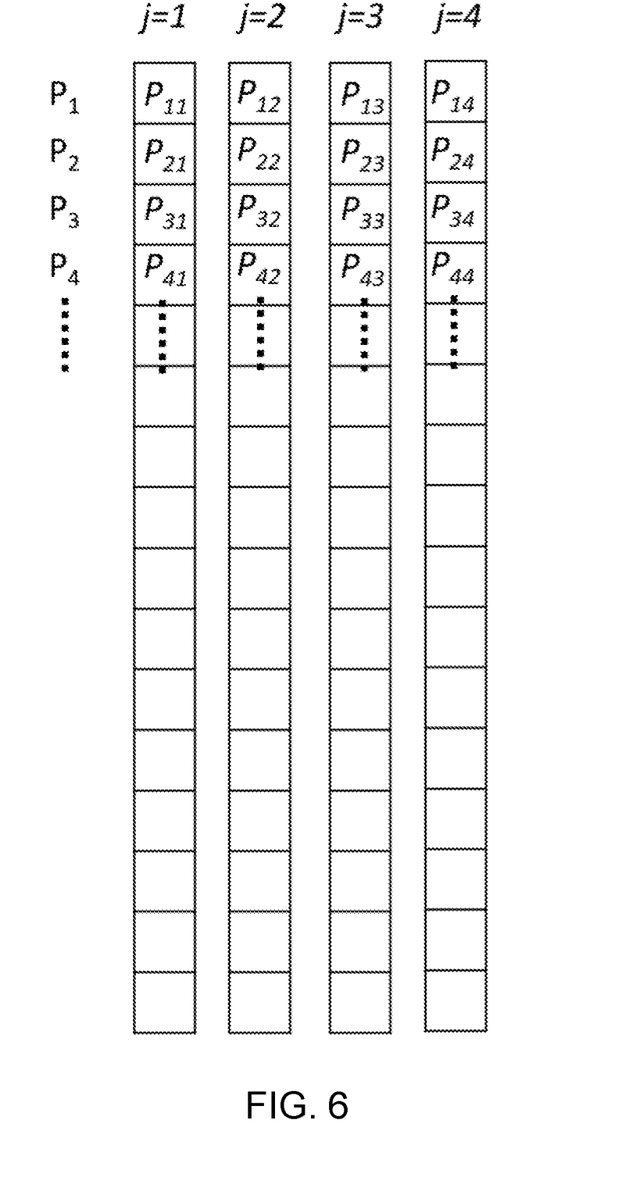
FIG. 6 shows a pivoted structure of a vector Pi according to embodiments of the disclosure.

FIG. 6 shows a pivoted structure of a library vector Pi according to embodiments of the disclosure, wherein each of the library vectors Pi has a plurality of vector coefficients 'Pij' (which may alternatively be called elements). Vector Pi (non-italic font in FIG. 6) is the vector for element 'i'. In a particular vector, e.g. for 'i=2, j=3', the value of the vector coefficient P23 reflects some attribute of P2, which may be numeric or non-numeric and can be compared with a similar "j=3"-attribute of another vector, which may be another library vector or the query vector. Referring to a specific example, in a facial recognition application, each 'i' will be a person and each 'j' will be an attribute of a person's face. Vector coefficients of each vector are represented in FIG. 6 with an italic font, so that 'Pi1' and 'Pi2' are the first and second coefficients of the vector Pi. For example, P13 (italic) is the third coefficient of vector P1 (non-italic) and P23 (italic) is the third coefficient of vector P2 (non-italic).

The data set of library vectors P1 . . . PN is pivoted as shown in FIG. 6. We know that the number of ciphertexts is also the number of coefficients in a vector. The number of vector coefficients M is assumed to be much smaller than the number of slots in a ciphertext, since this will be the case in usual real-world scenarios. There is thus a "block" of ciphertexts representing a data set of N vectors where the vector coefficients are spread across the M ciphertexts in order, so that: a ciphertext, 'ciphertext1', will hold the first vector coefficients, i.e. j=1, of all the 'i' vectors; 'ciphertext2' will hold the second vector coefficients, i.e. j=2, for all 'Pi' and so forth.

For the following description, we assume one block. However, other embodiments may incorporate more than one block's worth of vectors, in which case another block is created which can be computed on separately. Unlike the background example, with the proposed data set, there is no inherent waste of space.

The data repository holding the library of vectors Pi may for example be a database. The data repository could for example be held on a server, which may be a physical server or a virtual server. Moreover, the data repository may be a cloud computing node in a cloud computing environment.

The handling of the query vector S1 is now discussed. Since the data set of library vectors Pi has been pivoted, so too must the query vector S1. However, the query vector S1 is encrypted in a ciphertext, so the pivot must be carried out homomorphically. In concrete terms, taking a client-server cloud computing example, the cloud computing node hosting the data Pi will receive the query vector S1 in encrypted form and is tasked to carry out a computational task with the query vector S1 as an operand without decrypting it according to an FHE scheme.

Figure 7A:
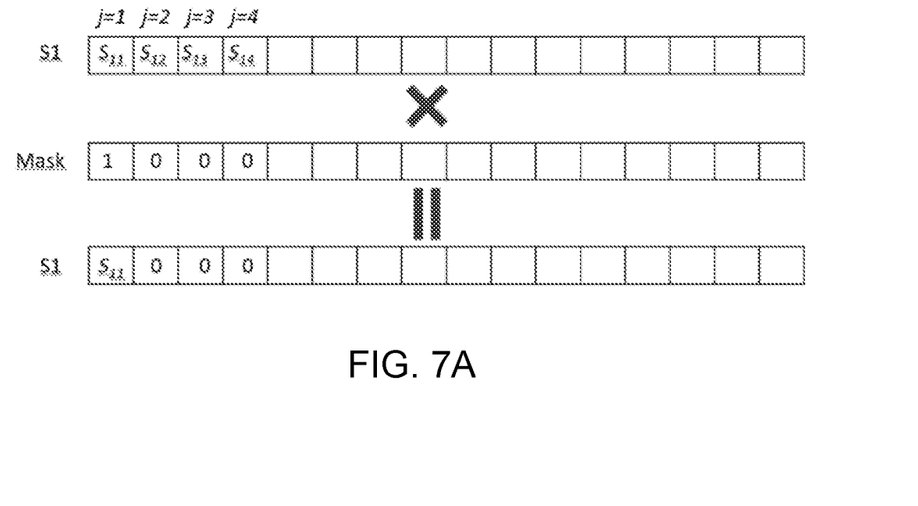
FIGS. 7A and 7B show aspects of homomorphic pivoting according to embodiments of the disclosure in which in FIG. 7A a masking operation is applied to pick out a coefficient in one of the slots, and in FIG. 7B a pivoted result is obtained by applying the masking operation to each slot and a replicate function to the coefficient value in each of the slots.
Figure 7B:
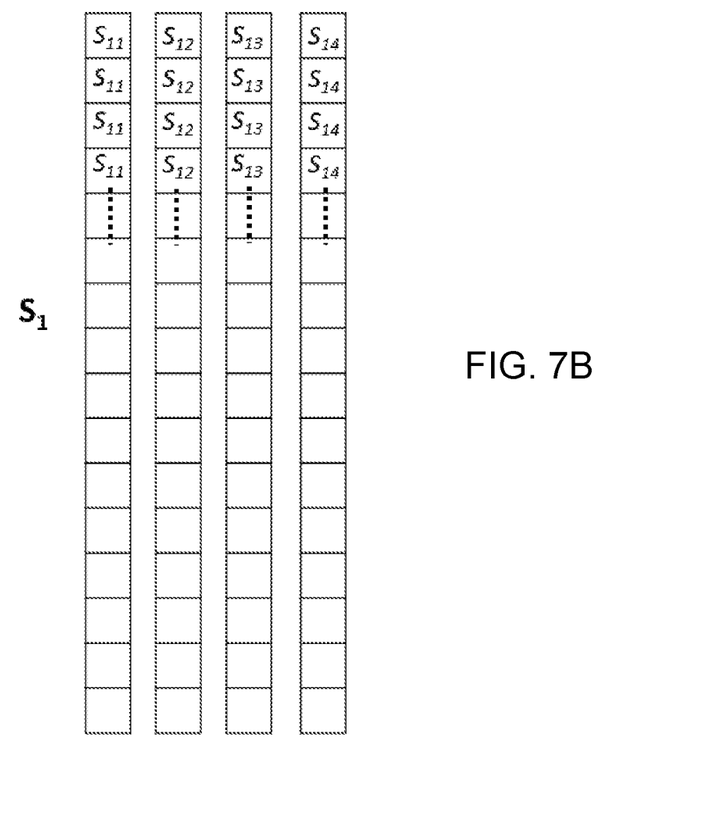

FIGS. 7A and 7B shows these aspects of the proposed homomorphic pivoting in which (FIG. 7A) a masking operation is applied to pick out a coefficient in one of the slots, and (FIG. 7B) a pivoted result is obtained by applying the masking operation to each slot and a replicate function to the coefficient value in each of the slots. The masking separates out the query vector into its coefficient vectors as illustrated in FIG. 7B. To compute each vector, we mask the jth coefficient out of the S1 vector and replicate. Replication can be carried out using the HElib replicate function such as the function described in the "Algorithms in HElib" Shai Halevi and Victor Shoup, Cryptology ePrint Archive: Report 2014/106 https://eprint.iacr.org/2014/106.pdf. However, other functions can be used.

The incoming ciphertext to be homomorphically pivoted may include more than one query vector, e.g. S1, S2 etc, and the whole multi-query vector ciphertext may be pivoted. This will save on transmission in a real-world scenario in which all the vectors of a user query are capable of being fitted into a single ciphertext, thereby avoiding having to transmit multiple ciphertexts, i.e. M ciphertexts. However, if each ciphertext contains more than one query vector, then masking operations would be required to pull out each query vector prior to applying summation and thresholding to each query vector in its own ciphertext.

The effect of the pivoting is to transform the block of ciphertexts representing a data set of N vectors into a form where each ciphertext holds the jth coefficient of every vector Pi. This is in contrast with the background example where each ciphertext holds all 'j' coefficients of the 'ith' vector (i.e. all the vector coefficients 'j' for a given Pi). This is the difference that is shown by comparing FIG. 4 and FIG. 6. This departs from the general standard approach in the prior art when vector algebra needs to be implemented in FHE, which is to map each vector into its own ciphertext. While this works well for some problems, it is not computationally efficient in the present case of calculating vector differences, where our proposed pivoting solution is superior. The advantages of the proposed approach stem from the fact that the summation step is the summation of the coefficients done by adding the squared delta ciphertexts together, which is a completely different ciphertext operation from the background example where the summation step is the summation of slots within each ciphertext, which is costly. Further computational efficiency is gained in the thresholding operation, since a consequence of the proposed summation step is that the threshold function only needs to be performed once, namely on the single ciphertext that represents all the summed square delta results for all 'i' of the candidate vectors Pi. By contrast, with the background example, the thresholding has to be performed on each squared delta ciphertext, i.e. for each candidate vector Pi, individually.

The principal steps in a threshold comparison between ciphertext vectors P1 . . . PN and S1 will be as follows, where N is the number of vectors in the data set:
1. Pivot vectors P1 to PN as a single set (see FIG. 6)
2. Homomorphically pivot S1 using a mask (see FIGS. 7A and 7B)
3. Calculate a difference Pij-S1j for each of the ciphertexts in the block, so that 'j' difference values 'delta' are obtained, wherein each difference computation obtains the difference for one of the 'j' coefficients for all 'i' library vectors.
4. Calculate delta^2 for each of the 'j' difference values 'delta'
5. Sum the delta^2 values
6. Perform a single threshold calculation on the sum by polynomial evaluation Summation can be carried out using normal ciphertext addition.

It is thus apparent that the computations required by both the summation and threshold steps are greatly reduced in comparison with the background example, with the summation being carried out by a simple adding together of the M ciphertexts of the same block, and the thresholding requiring only one polynomial evaluation per ciphertext block.

The thresholding may be performed homomorphically by polynomial evaluation. Functions can either be defined by polynomials or an approximation thereof (e.g. Taylor series). Therefore, if a function is needed, its shape is defined as desired, for example a threshold function may be a step function. The 'x' values in the slots need to be converted into 'y' values, which is the pivot. The x-to-y conversion defines the function. Curve fitting is performed to obtain a polynomial that is that function or an approximation of it. That function can then be applied to the values held in a ciphertext's slots simply by inputting the ciphertext into the polynomial. HElib provides suitable facilities for doing this.

As mentioned above when discussing the background example, in applications where matching will be exact then the threshold step may not be needed, but may require a different transform.

Figure 8:
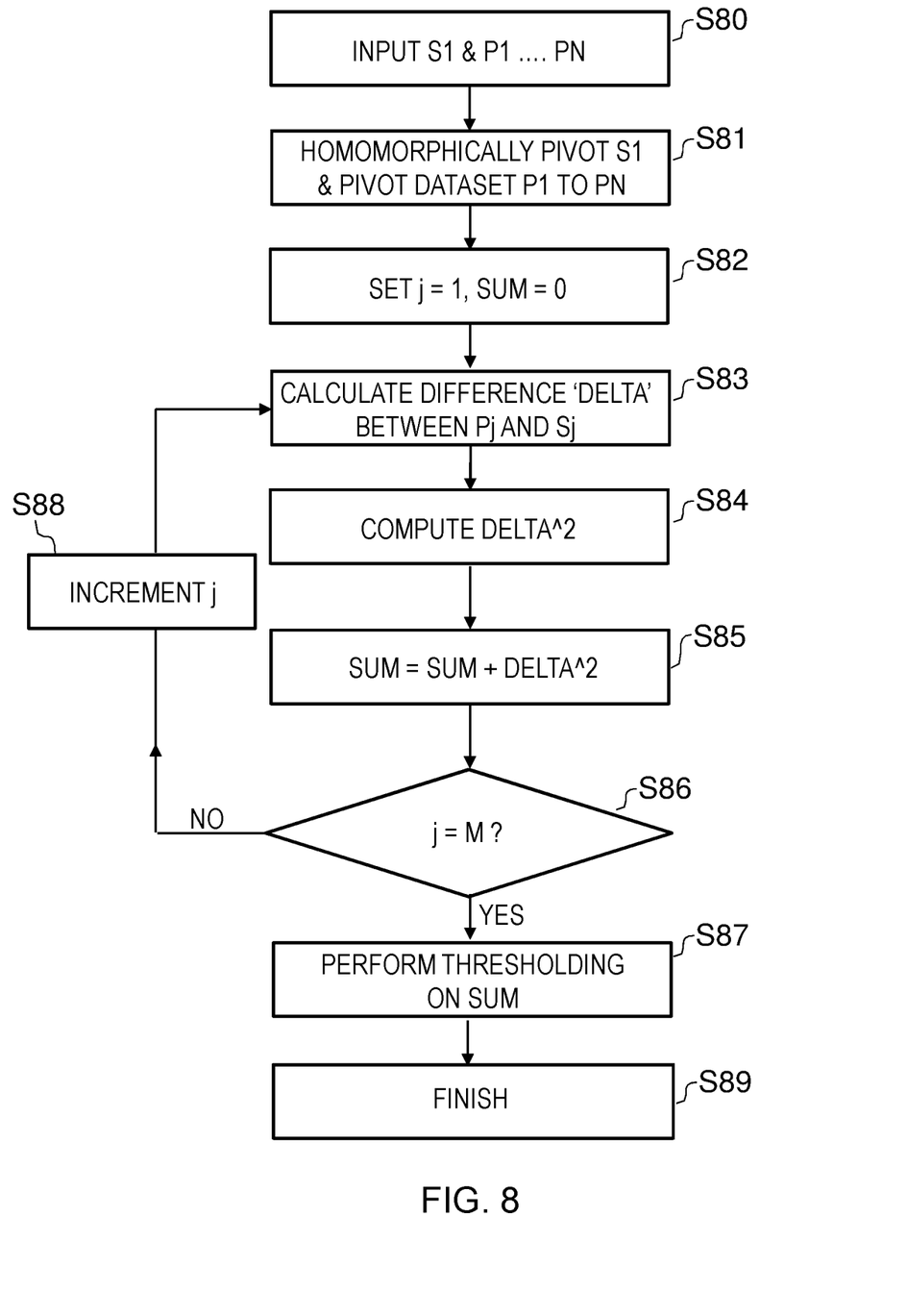
FIG. 8 is a flowchart showing a first embodiment method performed, at least in part, by the first embodiment system.

FIG. 8 is a flowchart showing the above-described method for performing a threshold comparison according to this embodiment of the disclosure.

In Step S80, a data set containing a plurality 'i' of library vectors Pi (i.e. P1 . . . . PN) is provided, each library vector Pi comprising a plurality 'j' of coefficients Pij, as well as a query vector S1 also having the same 'j' coefficients, where 'j' runs from 1 to M.

In Step S81, the method pivots the library vectors P1 to PN as a single set (see FIG. 6) and homomorphically pivots the query vector S1 using a mask (see FIGS. 7A and 7B).

In Step S82, a counter for 'j' and an encrypted sum vector (SUM) are initialized, i.e. Set j=1, SUM=0.

In Step S83, the method calculates in one homomorphic operation the difference, 'delta' between vector coefficients Pij and S1j for all 'i'.

In Step S84, the method calculates the square of delta, 'delta^2'.

In Step S85, the method computes the sum of the square of delta which for the first loop, i.e. for j=1 is the delta squared value for j=1, the sum then accumulating with each traversal of the loop as 'j' is incremented.

In Step S86 it is tested whether j has reached M. If j<>M then in Step S88 there is an increment of 'j' and process flow jumps back to Step S83 to compare the difference between vector coefficients Pij+1 and S1j+1 for all 'i.'

If j=M then process flow continues to Step S87 in which the method performs a single threshold operation by polynomial evaluation on the summed delta squared value, noting that the summed delta squared value is for all 'i' and 'j' and thus computes the thresholds between every library vector Pi and the query vector S1 in a single operation.

After the threshold operation, the method is then complete as indicated with the finish step S88.

In summary, the background example approach calculates for each of the 'i' ciphertexts $$T(SUM((c\_i-s1)^2))$$

where

T is the polynomial threshold function

SUM is the Sum function defined in "Algorithms in HElib"

c_i is the ciphertext containing the 'ith' P vector, Pi, and s1 is the ciphertext containing suspect vector S whereas the pivoted way delivers as an end result only one ciphertext through the equation $$T(\Sigma j=1 \text{ to } M\{(c\_j-S\_j)^2\})$$

where c_j is the ciphertext for coefficient 'j' for all 'i'

S_j is the ciphertext for coefficient 'j' for the suspect or query vector S (homomorphically pivoted as in FIG. 7).

We have therefore described how to carry out operations in a fully homomorphic encryption scheme. A fully homomorphic operation is performed on a data set by applying an encrypted operand supplied as a ciphertext. A data set containing 'i' library vectors, each with 'j' coefficients is subjected to a pivot operation such that each set of common 'j' coefficients is stored in respective library ciphertexts. A query ciphertext containing a query vector is then subjected to a homomorphic pivot operation to separate out its 'j' coefficients into respective pivoted query ciphertexts. A more efficient homomorphic computation can then be carried out between the ciphertexts of the pivoted forms of the query and library vectors so as to compute an encrypted set of vector differences between the query vector and each of the library vectors.

It will be clear to one skilled in the art that many improvements and modifications can be made to the foregoing exemplary embodiment without departing from the scope of the present disclosure.

What is claimed is:

1. A computer program product stored on a computer readable medium and loadable into the internal memory of a computer, when said program is run on a computer, causes the computer to execute the method of:
   providing a data set containing a plurality 'i' of library vectors, each library vector comprising a plurality 'j' of coefficients;
   carrying out a pivot operation on the data set of library vectors such that each set of common 'j' coefficients is stored in respective library ciphertexts;
   receiving a query ciphertext containing in encrypted form at least one query vector, also each comprising said plurality of coefficients;
   carrying out a homomorphic pivot operation on the query ciphertext to separate each of its 'j' coefficients into respective pivoted query ciphertexts;
   carrying out a homomorphic computation between the ciphertexts of the pivoted forms of the query and library vectors so as to compute an encrypted set of vector differences between the query vector and each of the library vectors; and
   transmitting the encrypted set of vector differences as a result.

2. The computer program product of claim 1, wherein the homomorphic computation comprises:
   calculating in a homomorphic difference operation a difference parameter value representing a vector difference between the 'jth' coefficient of the query vector and the 'jth' coefficient of every library vector;
   repeating for each other value of 'j' so that 'j' vector difference parameter values are obtained; and
   homomorphically combining the difference parameter values to obtain said encrypted set of vector differences between the query vector and each of the library vectors.

3. The computer program product of claim 2, wherein the difference parameter value is the square of the vector difference.

4. The computer program product of claim 2, further comprising:
   further processing said encrypted set of vector differences by performing a homomorphic threshold calculation using a homomorphic polynomial evaluation.

5. The computer program product of claim 1, wherein the library vectors represent a physical entity, and the coefficients of the library vectors represent attributes of the physical entity.

6. The computer program product of claim 5, wherein the physical entity is a person.

7. The computer program product of claim 6, wherein the attributes are physical attributes.

8. The computer program product of claim 7 wherein the physical attributes includes at least one biometric parameter.

9. The computer program product of claim 8 wherein the at least one biometric parameter is a facial feature.

10. The computer program product of claim 8 wherein the at least one biometric parameter is a fingerprint.

11. The computer program product of claim 8 wherein the at least one biometric parameter is an iris.

12. The computer program product of claim 8 wherein the at least one biometric parameter is a voice pattern.

13. The computer program product of claim 8 wherein the at least one biometric parameter is DNA.

14. A system for performing a homomorphic operation on a data set by applying an encrypted operand, comprising:
   at least one multi-core, multi thread processor;
   at least one memory component;
   wherein the at least one processor and at least one memory component are configured to perform a method of:
      carrying out a pivot operation on a data set containing a plurality of library vectors, wherein each library vector comprises a plurality 'j' of coefficients, such that each set of common 'j' coefficients is stored in respective library ciphertexts;
      receiving a query ciphertext containing in encrypted form at least one query vector, also each comprising said plurality of coefficients;
      carrying out a homomorphic pivot operation on the query ciphertext to separate each of its 'j' coefficients into respective pivoted query ciphertexts;
      carrying out a homomorphic computation between the ciphertexts of the pivoted forms of the query and library vectors so as to compute an encrypted set of vector differences between the query vector and each of the library vectors; and transmitting the encrypted set of vector differences as a result.

15. The system of claim 14, wherein the homomorphic computation comprises:

calculating in a homomorphic difference operation a difference parameter value representing a vector difference between the 'jth' coefficient of the query vector and the 'jth' coefficient of every library vector;

repeating for each other value of 'j' so that 'j' vector difference parameter values are obtained; and homomorphically combining the difference parameter values to obtain said encrypted set of vector differences between the query vector and each of the library vectors.

16. The system of claim 15, wherein the difference parameter value is the square of the vector difference.

17. The system of claim 15, further comprising:

further processing said encrypted set of vector differences by performing a homomorphic threshold calculation using a homomorphic polynomial evaluation.

18. The system of claim 14, wherein the library vectors represent a physical entity, and the coefficients of the library vectors represent attributes of the physical entity.

19. The system of claim 18, wherein the physical entity is a person.

20. The system of claim 19, wherein the attributes are physical attributes.

* * * * *